May 8, 1923.
R. R. McCLURE
ELECTRICALLY OPERATED OIL CUP
Filed Oct. 20, 1921
1,454,123
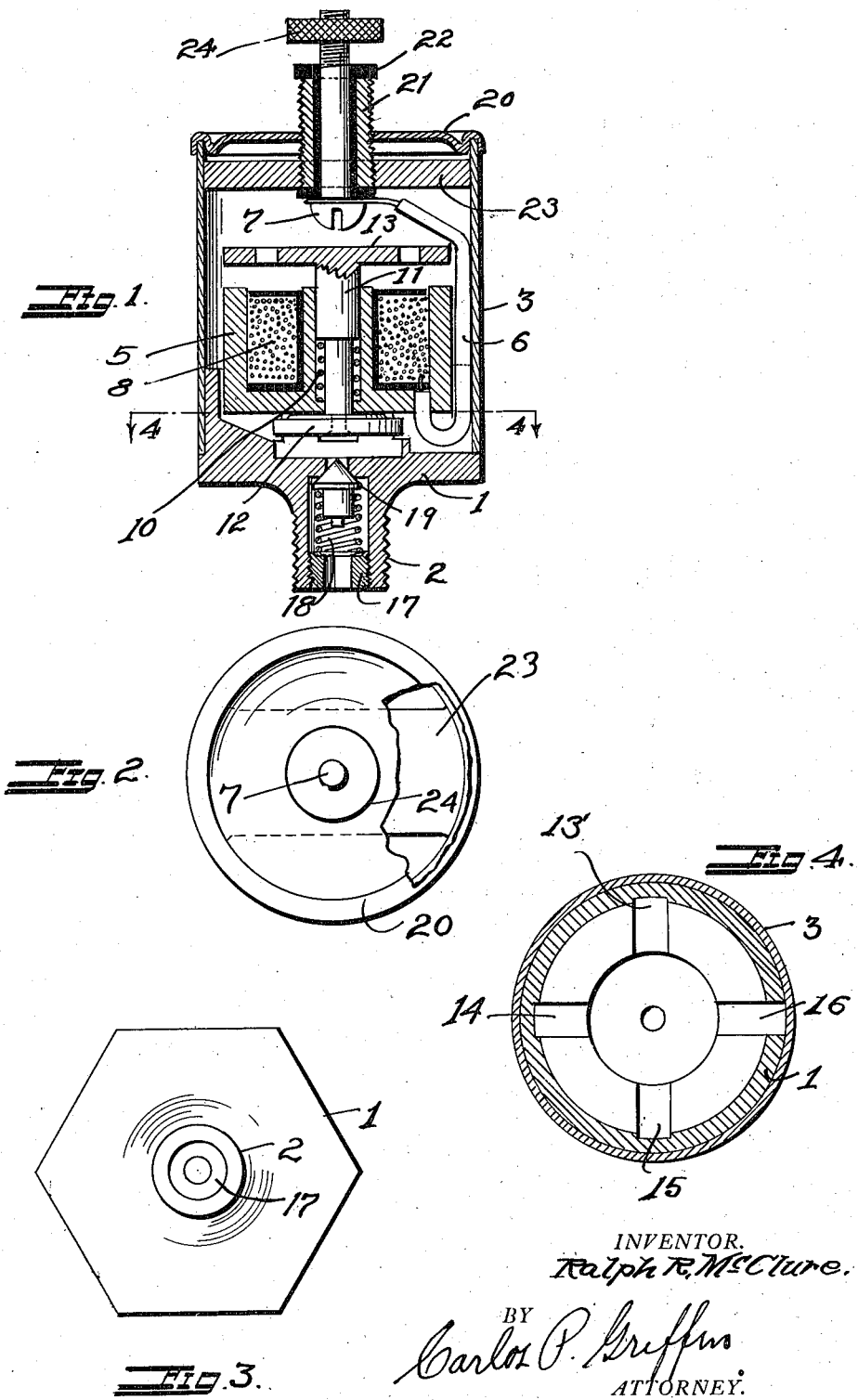
INVENTOR.
Ralph R. McClure.
BY
Carlos P. Griffin
ATTORNEY.

Patented May 8, 1923.

1,454,123

UNITED STATES PATENT OFFICE.

RALPH R. McCLURE, OF SAN FRANCISCO, CALIFORNIA, ASSIGNOR, BY DIRECT AND MESNE ASSIGNMENTS, TO McCLURE ELECTRIC OILING SYSTEM, A CORPORATION OF CALIFORNIA.

ELECTRICALLY-OPERATED OIL CUP.

Application filed October 20, 1921. Serial No. 509,033.

*To all whom it may concern:*

Be it known that I, RALPH R. McCLURE, a citizen of the United States, residing at San Francisco, in the county of San Francisco, State of California, have invented a new and useful Electrically-Operated Oil Cup, of which the following is a specification, in such full and clear terms as will enable those skilled in the art to construct and use the same.

This invention relates to an electrically operated oil cup and its object is to produce in compact form an oiler for bearings which is capable of being operated at a distance and which will deliver measured quantities of oil under considerable pressure to the bearing each time the oiler is operated.

Another object of the invention is to produce a compact and simple oil cup which will prevent oil leakage to the bearing and which can be operated with sufficient force to insure forcing the oil through dirty bearings.

Another object of the invention is to produce an oil cup which is easily filled and in which the parts are so assembled as to give the necessary structure to provide for properly seating the cover while at the same time means is also provided for securing the necessary electrical connections to the oil cup, Among other features, the invention has for one of its objects to provide a construction wherein the lubricant or fluid acted on by the forcing member or piston serves as a fluid cushion for retarding its movement enabling the operator to readily detect the operation of the forcing member or piston within an empty cup, as the lack of fluid cushion enables the forcing member to freely operate with considerable force and consequent noise which is readily detected by the operator.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a vertical sectional view of the complete oil cup,

Fig. 2 is a plan view of the oil cup with a portion of the top broken away.

Fig. 3 is a bottom plan view of the oil cup, and

Fig. 4 is a sectional view of the oil cup on the line 4—4 with the plunger removed.

The oil cup consists of a base 1 suitably threaded at 2 to be connected with any desired bearing, and also secured to the base is the cylindrical shell 3 which affords the space for the insulation of the electrical connections and electro-magnet as well as the space for the oil supply, the magnet wires being covered with a material which is impervious to the oil used.

Pressed tightly into a recess in the base 1 is the open shell core 5 made of soft iron to give the desired magnet effect. An electric wire 6 suitably insulated passes from the bottom of the core 5 outside the same and up to the binding screw 7.

The electromagnet consists of the ordinary form of a spool wound magnet as indicated at 8 inserted in place in the shell 5 and suitably secured thereto.

The core 5 has a hole therethrough at the center large enough to receive the spiral spring 10 which bears upon a shoulder at the bottom of said hole and upon a shoulder of the stem 11, which stem has the pump plunger 12 at its lower end and the movable armature 13 at its upper end.

The plunger 12 moves in a small chamber in the base 1, said chamber having a plurality of openings as indicated at 13' to 16 to receive the electric wire 6 and to permit the oil to pass from the main oil casing to the oil pressure chamber before the piston 12. The plunger operates with a sliding fit within said small chamber, thus under certain conditions of operation, the oil volume displaced thereby through the nipple 2 may be varied, the excess returning to the cup by passing between the wall of the plunger and chamber.

Within the nipple 2 there is a threaded collar 17 which holds a light spiral spring 18 and check valve 19 in place to prevent the leakage of oil and to prevent oil from working into the bearing and back into the oil cup. The adjustment of collar 17 to vary the tension of spring 18 affords means for controlling the charge of lubricant expressed past the check valve 19, as the greater the tension of spring 18, the greater the amount of fluid by-passed around the piston 12.

The cup has a flange cover 20 which is threaded on a sleeve 21 surrounding the insulating sleeve 22 on the binding screw 7. The binding screw is forced into said insulating sleeve and is secured to the oil cup by means of the sleeve 21 which is threaded into a cross bar 23 carried by the oil cup shell 3. At its upper end the binding screw 7 has a knurled nut 24 for securing the electrical connections thereto.

It will be seen that there is but one conductor leading to the magnetic coil, the other end of the wire of said coil being suitably grounded to avoid the necessity of having two wires extending to the oil cup.

What I claim is as follows, but various modifications may be made in the construction shown in the drawings and above particularly described form, within the purview of my invention.

1. An electric oil cup comprising a base, a check valve therein, a piston movable in a chamber in said base, a stem carrying the piston, an armature on the stem, an electromagnet within the oil receiving chamber for forcibly operating the piston to force oil through the check valve and into a bearing, and a spring for normally raising said piston within said chamber, said parts being contained within said cup.

2. An oil cup comprising a base, a cylindrical shell secured thereto forming an oil receptacle, a check valve in the base, an electromagnet within the oil receiving chamber, a piston movable in a chamber in the base to force oil therefrom, the electromagnet being arranged to operate said piston, a binding post projecting upwardly from the cup to secure the electrical connections to the top of the oil cup, and a cover plate threaded on said securing means with its peripheral edges when said cover is in closed position engaging the upper edge of said oil cup.

3. An oil cup including a shell having an outlet, a check valve therein, an oil collecting chamber within the shell in communication with said outlet, a fluid expelling piston movable into said chamber, means for normally maintaining said piston removed from said chamber to permit the oil within the shell to fill said chamber, and electromagnetic means for actuating said piston within said chamber to displace the oil therein from said outlet.

4. An oil cup including an oil receiving chamber provided with an outlet, an electromagnetic operated means therein for forcibly expelling a predetermined quantity of oil from said chamber through said outlet, a binding post extending upwardly from the center of the cup, and a cup cover threaded to said post with its peripheral edge adapted to engage the upper edge of the cup.

5. An oil cup comprising a base, a shell extending upwardly therefrom, said base provided with a tubular mounting nipple affording an oil outlet, a cup forming shell extending upwardly from the periphery of the base, said base provided with an upstanding flange, a magnet core frictionally held thereby with portions in spaced relation to said shell, affording an oil passage therebetween, said base provided on its interior with radial channels terminating in a sump surrounding said outlet and at their outer ends communicating with said oil passage, a magnet spool carried by said core, a valve stem operating therethrough, a piston on the lower end thereof for operating in said sump, an armature at the upper end of said piston, a spring for normally maintaining said armature spaced from said magnet and the piston raised from said sump, a supporting spider engaging the upper walls of said cup, a tubular stem threaded on its exterior and extending upwardly from the center thereof, a binding post within said stem and insulated therefrom, a connection between said magnet and binding post, and a cup cover adjustably threaded on said stem.

In testimony whereof I have hereunto set my hand this 13th day of October, A. D. 1921.

RALPH R. McCLURE.